United States Patent
Baqasse et al.

(10) Patent No.: US 9,541,021 B2
(45) Date of Patent: Jan. 10, 2017

(54) METHOD FOR LEARNING A MINIMUM ACTUATION DURATION OF FUEL INJECTORS OF AN INTERNAL COMBUSTION ENGINE

(71) Applicant: Robert Bosch GmbH, Stuttgart (DE)

(72) Inventors: Brahim Baqasse, Stuttgart (DE); Udo Schulz, Vaihingen/Enz (DE); Markus Hernier, Gerlingen (DE); Thiebaut Beyrath, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 131 days.

(21) Appl. No.: 14/362,337

(22) PCT Filed: Nov. 13, 2012

(86) PCT No.: PCT/EP2012/072492
§ 371 (c)(1),
(2) Date: Jun. 2, 2014

(87) PCT Pub. No.: WO2013/083366
PCT Pub. Date: Jun. 13, 2013

(65) Prior Publication Data
US 2014/0338640 A1    Nov. 20, 2014

(30) Foreign Application Priority Data
Dec. 8, 2011   (DE) .................. 10 2011 087 961

(51) Int. Cl.
*F02M 51/00*    (2006.01)
*F02D 41/14*    (2006.01)
(Continued)

(52) U.S. Cl.
CPC ......... *F02D 41/1402* (2013.01); *F02D 41/221* (2013.01); *F02D 41/247* (2013.01); *Y02T 10/40* (2013.01)

(58) Field of Classification Search
CPC .... F02D 41/1402; F02D 41/20; F02D 41/247; F02D 41/221; F02D 41/222; F02D 41/042; F02D 41/06; F02D 41/062; F02D 41/2464; F02D 41/2467; F02D 2041/202
(Continued)

(56) References Cited

U.S. PATENT DOCUMENTS 6,192,855 B1   2/2001  Schietecatte
6,964,261 B2   11/2005 Warne et al.
(Continued)

FOREIGN PATENT DOCUMENTS

CN   1692219 A    11/2005
CN   101718230 A  6/2010
(Continued)

OTHER PUBLICATIONS

Chapter 5: Dissertation of Dipl.-Ing. Soeren Hans-Juergen Mueller, entitled, "Der Startvorgang von hybridisierten Ottomotoren" [Start-up process for hybridized gasoline engines] (Darmstadt 2010).
(Continued)

*Primary Examiner* — Hai Huynh
(74) *Attorney, Agent, or Firm* — Norton Rose Fulbright US LLP; Gerard Messina

(57) ABSTRACT

A method for learning and determining a minimum injector-specific electric actuation duration for at least one fuel injector of an internal combustion engine of a motor vehicle. Starting with a predefined electric actuation duration which definitely does not result in an injection, the electric actuation duration is gradually increased in each engine stop and/or in each engine start in successive engine stops and/or in successive engine starts of the internal combustion engine up to an actuation duration in which an injection with a combustion occurs, and then this actuation duration may be
(Continued)

determined as the minimum electric actuation duration. The invention also relates to a corresponding device.

11 Claims, 3 Drawing Sheets

(51) Int. Cl.
*F02D 41/22* (2006.01)
*F02D 41/24* (2006.01)

(58) Field of Classification Search
USPC ....... 123/472, 478, 479, 482, 487, 488, 490; 73/114.38, 114.45; 701/103, 104, 112, 113
See application file for complete search history.

(56) References Cited

U.S. PATENT DOCUMENTS

| | | | |
|---|---|---|---|
| 7,093,586 B2* | 8/2006 | Mattes | F02D 41/247 123/478 |
| 7,131,429 B2* | 11/2006 | Dietl | F02D 41/062 123/490 |
| 7,558,665 B1 | 7/2009 | Geveci et al. | |
| 7,845,343 B2 | 12/2010 | Imai | |
| 7,881,857 B2* | 2/2011 | Samenfink | F02D 41/1454 123/299 |
| 7,891,337 B2* | 2/2011 | Takeuchi | F02D 41/1497 123/436 |
| 8,306,723 B2* | 11/2012 | Haskara | F02D 35/023 123/435 |
| 8,347,862 B2* | 1/2013 | Pursifull | F02D 41/0027 123/478 |
| 2005/0126538 A1 | 6/2005 | Warne et al. | |
| 2007/0251507 A1* | 11/2007 | Mueller | F02D 41/12 123/493 |
| 2008/0308065 A1 | 12/2008 | Imai | |
| 2009/0164086 A1 | 6/2009 | Geveci et al. | |
| 2015/0142295 A1* | 5/2015 | Leblon | F02D 1/08 701/103 |
| 2015/0226148 A1* | 8/2015 | Beer | F02D 41/247 123/480 |

FOREIGN PATENT DOCUMENTS

| | | |
|---|---|---|
| DE | 199 45 618 | 3/2001 |
| DE | 10 2005 051701 | 5/2007 |
| DE | 10 2007 015654 | 10/2007 |
| DE | 10 2009 047830 | 6/2010 |
| DE | 10 2009 028650 | 2/2011 |
| EP | 1 350 941 A1 | 10/2003 |
| JP | 60 190637 | 9/1985 |
| JP | 2000-227041 A | 8/2000 |
| JP | 2001-090580 A | 4/2001 |

OTHER PUBLICATIONS

Dissertation of Dipl.-Ing. Soeren Hans-Juergen Mueller, entitled, "Der Startvorgang von hybridisierten Ottomotoren" [Start-up process for hybridized gasoline engines] (Darmstadt 2010), Chapter 5.

* cited by examiner

METHOD FOR LEARNING A MINIMUM ACTUATION DURATION OF FUEL INJECTORS OF AN INTERNAL COMBUSTION ENGINE

FIELD OF THE INVENTION

The present invention relates to a method and a device for learning a minimum actuation duration of fuel injectors of an internal combustion engine.

BACKGROUND INFORMATION

Common rail injection, also referred to as storage injection, is a fuel injection system for internal combustion engines in which a high pressure pump brings fuel up to a high pressure level. The pressurized fuel then fills a system of pipes which is constantly under pressure during operation of the engine. An essential idea of common rail fuel injection is a complete separation of pressure generation from the actual injection process. This makes an injection controlled exclusively by engine characteristic maps possible. An injection timing and an injection quantity are controlled by an electronic engine control. The engine control controls an electrically actuated fuel injector for each cylinder, the fuel injection valve also being referred to as a fuel injector.

A storage injection system in a four cylinder diesel engine includes, for example, an air flow meter, a control unit, a high pressure pump, a high pressure storage (rail), fuel injectors, a crankshaft speed sensor, a coolant temperature sensor and an accelerator pedal sensor. Such a storage injection system-common rail may vary in the number of fuel injectors depending on the present cylinders. Furthermore, the type of pressure regulation may differ among the various fuel injection systems. For example, in the so-called adjuster concept with radial pumps, the pressure regulator on the rail is dispensed with, or in the case of plug-in pumps, the proportional quantity valve on the intake side of the high pressure pump is dispensed with. In addition, there may be deviations in the type of pre-feed.

When learning a minimum actuation duration of fuel injectors, for example, in accordance with BOSCH's own "zero quantity calibration" concept, starting from a minimal electrical actuation duration which definitely does not result in an injection, the actuation duration during an internal combustion engine coasting, is gradually increased until a change in the engine speed, measurable via a corresponding crankshaft sensor speed signal of the internal combustion engine, occurs as a result of a combusted injected quantity of fuel. Based on a minimum electrical injector-specific actuation duration ascertained in this manner, all injection types, for example pilot injections, are corrected injector-specifically with respect to their actuation duration. An actuation duration is equivalent to the duration of an injection or an injection duration.

In hybrid concepts which allow the internal combustion engine to be shut off, such as for example, during pure electric driving during the parallel hybrid or combustion engine-off coasting, the internal combustion engine is uncoupled and switched off to avoid drag losses. However, this would then fully omit the internal combustion engine coasting phases necessary for the above-described learning method.

In particular for so-called start/stop systems a quick and convenient starting is desired. Factors identified as limiting a starting reliability have included limited controllability of an engine stop into a defined target position, as well as an excessively low combustion moment at high engine temperatures due to excessively low air density. A typical drag moment resulting from charge compression, friction and mass moment of inertia of an internal combustion engine during an engine start amounts to approximately 120 Nm in a gasoline engine, which represents a dynamic gas exchange moment.

Dragging a gasoline engine over its top dead center requires approximately 50 Nm. The essential features that distinguish diesel engines from gasoline engines are the following:

The method of combustion (auto-ignition) and the associated higher compression ratios (cf. charge compression), higher cylinder peak pressures (cf. friction) and the associated heavier weights of the diesel engine with respect to the mass moment of inertia. This results in a greater expenditure during an engine start-up with respect to starting performance and, depending on the number of cylinders, in an irregular stopping of the corresponding diesel power plant compared to the gasoline engine. Due to the comparatively high cylinder peak pressures, approximately double the amplitude of the gas exchange moment from cylinder to cylinder is to be expected in a diesel engine. Associated with that is a greater vibrational excitation of the power plant and an uncomfortable starting and stopping process. To prevent uncomfortable shaking motions of the internal combustion engine due to gas exchange moments, throttle valves in the intake duct and/or exhaust gas flaps of the exhaust gas system of the internal combustion engine are closed. As a result, the cylinder pistons flex against the air columns on the intake and exhaust gas sides.

The dissertation of Dipl.-Ing. Sören Hans-Jürgen Müller, entitled "Der Startvorgang von hybridisierten Ottomotoren" (Start-up process for hybridized gasoline engines) (Darmstadt 2010), in particular Chapter 5, explains the hybrid start-up of a gasoline engine in greater detail.

SUMMARY OF THE INVENTION

An object of the present invention was to make it possible to avoid combustion engine coasting phases for learning a minimum actuation duration of fuel injectors in hybrid drive concepts, or to accelerate the learning in conventional drive concepts with internal combustion engines and engine coasting operation by extending the area of learning to an engine start and an engine stop.

Against this backdrop, a method having the features described herein and a device having the features described herein are provided. Advantageous specific embodiments of the present invention result from the subclaims, the following description and the attached figures.

According to the method according to the present invention, it is provided that to learn and determine a minimum injector-specific electric actuation duration for at least one fuel injector of an internal combustion engine of a motor vehicle, the electric actuation duration, starting with a predefined electric actuation duration which definitely does not result in an injection, is gradually increased in each engine stop and/or each engine start in successive engine stops and/or in successive engine starts of the internal combustion engine up to an actuation duration in which an injection with a combustion occurs, which is then determined as the minimum electric actuation duration.

A gradual increase in the actuation duration is understood within the context of the present description to mean that when carrying out the method according to the present invention in each engine start or in each engine stop in successive engine starts or engine stops starting with the predefined electric actuation duration in which definitely no injection occurs, at least one increment respectively is added to the last adjusted actuation duration, to which an increment is again added in the following engine start or engine stop until finally an injection with a combustion is detected via an engine speed signal. An increment in this case is a previously determined amount of a time unit by which the actuation duration is to be increased or changed. Similarly, a decrement describes a corresponding amount of a time unit by which the actuation duration is to be lowered or reduced.

The number of increments by which the actuation duration is increased in successive engine stops or engine starts may be flexibly adjusted. This means that, depending on the need, the number of increments to be added in one engine stop and engine start may vary in the range of from one increment up to ten or more increments. If necessary, it is also possible when carrying out a learning process to accelerate the learning process by increasing the number of increments to be added in successive engine stops and/or successive engine starts used in the learning process, gradually from engine stop to engine stop or engine start to engine start.

It should be noted, however, that an increase in the number of increments to be added in a respective engine stop or engine start prolongs the engine stop or engine start, for example, per increment by one camshaft rotation.

Since the learning process generally may not be concluded with just one engine start, but rather a plurality of successive engine starts are generally required in order, starting from the predefined electric actuation duration in which definitely no injection occurs, to achieve the actuation duration minimally required for an injection with a combustion to occur, it is necessary during and after an engine start, after the one learning step as it has been completed in the respective engine start, to adjust a last learned actuation duration or an actuation duration in which no misfiring occurs until the first or renewed minimal actuation duration is learned, i.e., this actuation duration must result in an ignition of the engine. If the learning process is carried out in a series of successive engine stops, then here it is the case that, as long as the minimal actuation duration is not achieved, actuation no longer occurs at all after one learning step in a respective engine stop, or a switch is made to an actuation duration in which definitely no injection will occur, since of course the engine is in the engine stop mode.

The core of the method according to the present invention is a shift or extension of the learning of the minimum electric actuation duration of fuel injectors from the internal combustion engine coasting as described above, to the internal combustion engine stop and/or the internal combustion engine start.

Internal combustion engine stop hereinafter signifies an internal combustion engine stop after terminal 15-off, or in stop operation in start/stop systems or in parallel hybrids. An internal combustion engine start signifies an internal combustion engine start after terminal 15-on or an internal combustion engine start in start operation in start/stop systems or in parallel hybrid concepts.

According to one possible specific embodiment of the method according to the present invention, it is possible for the electric actuation duration of the internal combustion engine to be gradually increased with each engine stop and/or each engine start.

In another possible specific embodiment of the method according to the present invention, an injection with a combustion is detected by comparing an instantaneously measured engine speed signal of a crankshaft sensor with the engine speed signal of the same crankshaft sensor when injection and combustion have definitely not occurred.

It is also conceivable when comparing the engine speed signals to use difference-forming methods and/or an evaluation of corresponding engine speed gradients of engine speed signals and/or comparisons of engine speed patterns.

The measuring window selected for the engine speed signal instantaneously to be measured is an area of the crankshaft in which a change in speed of the at least one fuel injector or of the at least one injector valve is to be expected.

The designations "injector valve" and "fuel injector" are used synonymously within the context of the present description.

According to another specific embodiment of the method according to the present invention, in the event the method is carried out with the internal combustion engine in engine stop, a normal switching off of injections for the internal combustion engine occurs following a switch-off signal with the injector which is situated in a regular injection sequence of the injectors before the injector to be learned.

Alternatively, according to another specific embodiment of the method according to the present invention, in the event the method is carried out with the internal combustion engine in engine start, a second possible fuel injector at which injection and ignition may occur may be determined based on a detection of the position of the stopped internal combustion engine, and the learning and determining of the actuation duration may then be carried out on this fuel injector.

The injector-specific minimum electric actuation duration determined may be stored and secured in a control unit memory of the motor vehicle.

As an alternative or in addition to the engine speed signals to be measured, it is conceivable to use a combustion chamber pressure sensor for detecting the injection with a combustion.

An advantage of the method according to the present invention lies in the avoidance of previously required internal combustion engine coasting phases in systems having the possibility of engine-off coasting and in parallel hybrid concepts, and therefore in fuel savings by omission of internal combustion engine drag resistance. In conventional drive concepts with internal combustion engines and engine coasting operation, it is possible using the method according to the present invention to effectively shorten the learning period.

In order to achieve the learning conditions for a respective fuel injector or injector valve in an internal combustion engine stop before the internal combustion engine in question comes to a stop, a normal switch-off of the injections after terminal 15-off may only take place with a fuel injector located in the injection sequence before the one to be learned, and consequently not necessarily with a fuel injector immediately following terminal 15-off. As long as the internal combustion engine rotates a working space of more than one cylinder further with terminal 15-off and with the switching off of the normal injections, the learning method for the respective associated fuel injector or the respective associated injector valve may be carried out on more than one cylinder.

As previously mentioned, the method as provided according to the present invention may in principle also be used in an engine start. In this case, a second possible cylinder, in which injection and ignition may occur, may be determined based on a detection of the position of the corresponding stopped engine, for example, from a previous engine stop, and the learning method may be used on this cylinder or on the associated fuel injector.

Then a normal start function known from the related art may be used on the next cylinder in accordance with the normal firing order.

The reference (crankshaft sensor) speed signal introduced above may further improve the above-described learning method with respect to comparing internal combustion engine speeds and/or their gradients by measuring and storing additional related data, such as, for example, an engine friction which is a function of engine temperature, valve timing, a starter motor speed for the learning method in start, a throttle valve opening, etc.

In conjunction with a conventional drive train with an internal combustion engine, the learning method according to the present invention may still take place, for example, in the internal combustion engine coasting, the learning period being shortened by an extension of the learning method according to the present invention to the engine start and/or engine stop phase. In present and active start/stop systems, the learning method is accelerated even further.

Also provided is a device for learning and determining a minimum, injector-specific electric actuation duration for at least one fuel injector of an internal combustion engine of a motor vehicle. The device according to the present invention includes an arrangement which, starting with a predefined electric actuation duration in which definitely no injection occurs, may gradually increase the electric actuation duration in each engine stop and/or each engine start in successive engine stops and/or in successive engine starts of the internal combustion engine up to an actuation duration in which an injection with a combustion occurs, and then determine this actuation duration as the minimum electric actuation duration.

The present invention also relates to a method for learning and determining a minimum injector-specific electric actuation duration for at least one fuel injector of an internal combustion engine of a motor vehicle, in which, starting with a predefined electric actuation duration which results in an injection with a combustion, the electric actuation duration is lowered gradually in each engine stop of successive engine stops up to an actuation duration in which just an interruption of an injection with a combustion occurs, the last achieved actuation duration in which an interruption of the injection does not yet quite occur being determined as the minimum electric actuation duration.

Here, an approximation of the minimum actuation duration to be determined may be achieved in that in each engine stop in successive engine stops an actuation duration in which definitely no injection occurs, is increased in each case successively by a predefined number of increments, and once an actuation duration is achieved in which an injection with a combustion occurs, the thus determined actuation duration is successively reduced in subsequent engine stops by a number of decrements which are respectively smaller in amount than the respective increments until an interruption of an injection with a combustion occurs, the last achieved actuation duration in which an interruption of the injection does not yet quite occur then being defined as the minimum actuation duration.

Similarly, the actuation duration, based initially on an actuation duration in which an injection with a combustion definitely occurs, may be successively reduced in successive engine stops until an interruption of an injection with a combustion occurs, and then in subsequent engine stops this last adjusted actuation duration is successively increased again until just an injection with a combustion occurs, the corresponding actuation duration then being determined as the minimum actuation duration.

Further advantages and embodiments of the present invention result from the description and the attached drawings.

It is understood that the aforementioned features and features still to be explained below may be used not only in the respectively indicated combination, but in other combinations as well or alone, without departing from the scope of the present invention.

DETAILED DESCRIPTION

Figure 1:
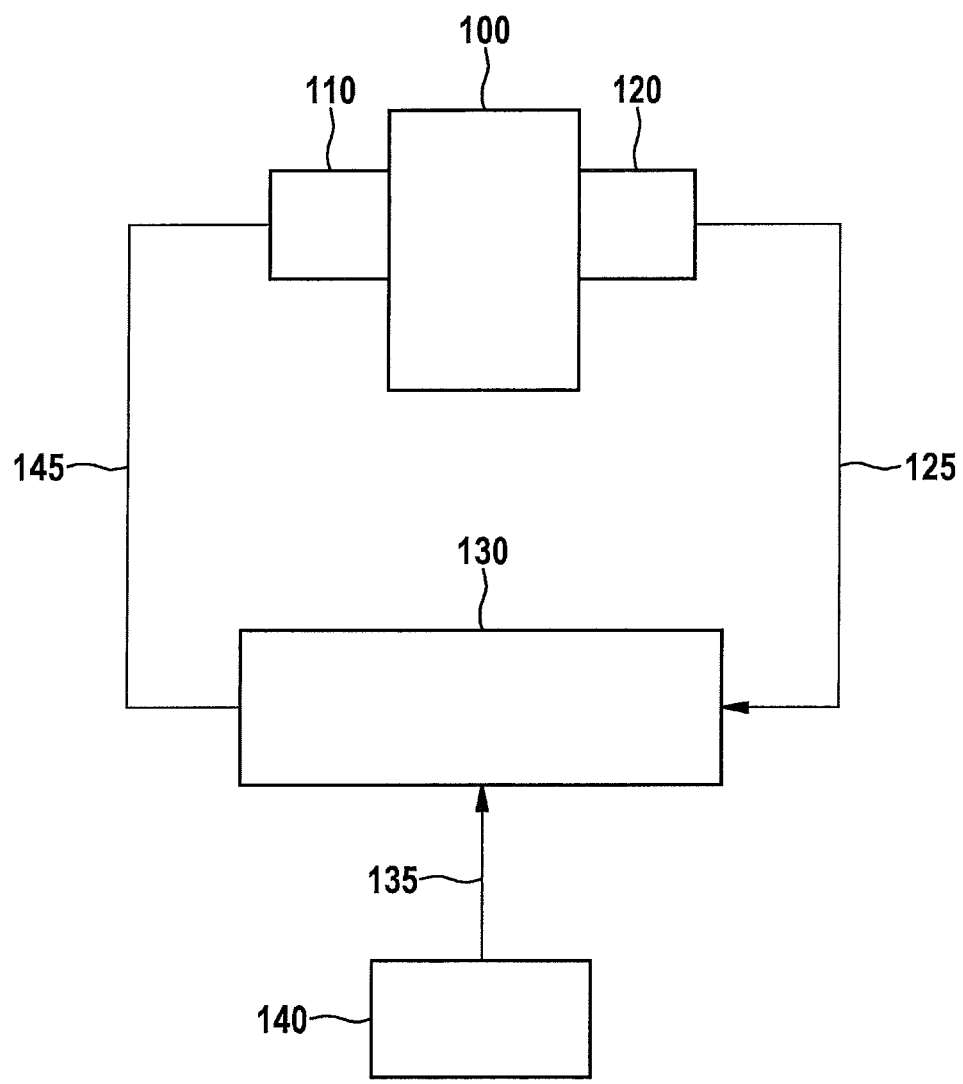
FIG. 1 schematically shows a representation of a fuel metering system of an internal combustion engine in which one specific embodiment of the method according to the present invention may be used.

FIG. 1 shows a block diagram with essential elements of a fuel metering system of an internal combustion engine. An internal combustion engine 100 is measured out a specific amount of fuel by a fuel metering unit 110 at a specific point in time. Various sensors 120 detect the measured values 125 which characterize an operating state of the internal combustion engine or of a corresponding internal combustion engine and forward these to a control unit 130. Also forwarded to control unit 130 are various output signals 135 of additional sensors 140. The latter detect variables which characterize a state of the fuel metering unit and/or environmental conditions. Based on measured values 125 and other variables 135, control unit 130 calculates control pulses 145 which act on fuel metering unit 110. Fuel metering unit 110 may be configured as a common rail system, for example. In this design, the duration and/or the start of a fuel injection is controlled with the aid of fuel injectors. Here, the corresponding injectors may contain a solenoid valve or a piezoelectric actuator.

Hereinafter, the solenoid valve and/or the piezoelectric actuator which influences the fuel metering is/are referred to as an electrically actuatable fuel injector.

Control unit 110 calculates in a manner known from the related art the amount of fuel to be injected into the internal combustion engine. This calculation is made subject to various measured values 125 such as, for example, an engine speed n, a corresponding engine temperature, an actual start of injection and potentially still other variables 135 which characterize an operating state of a corresponding motor vehicle. These additional variables are, for example, a driver intent such as, for example, a position of an accelerator pedal, or a pressure and a temperature of the ambient air. Control unit 110 then converts the desired fuel amount into control pulses. These control pulses then act on the element of the fuel metering unit which determines the fuel amount. The element which serves to determine the fuel amount is the electrically actuatable valve. This electrically actuatable valve is situated in such a way that the fuel amount to be injected is determined between the opening duration or by the closing duration of the valve. A small amount of fuel is frequently measured into a corresponding cylinder just prior to the actual injection. The noise characteristic of the engine may be significantly improved in this way. This injection is referred to as the pilot injection and the actual injection as the main injection. It may also be provided that a small amount of fuel is measured out after the aforementioned main injection, which is then referred to as a post-injection. As previously mentioned above, an essential point is the determination of a minimal actuation duration, also referred to as the minimum actuation duration. This minimum actuation duration results in an injection with a combustion, whereas actuation durations shorter than the minimum actuation duration do not result in an injection with a combustion. This minimum actuation duration is dependent on various factors such as, for example, a temperature, a type of fuel, a life span, a rail pressure, manufacturing tolerances of each injector and other influences. Accordingly, this minimum actuation duration must be known for each fuel injector in order to obtain a precise fuel amount.

Figure 2:
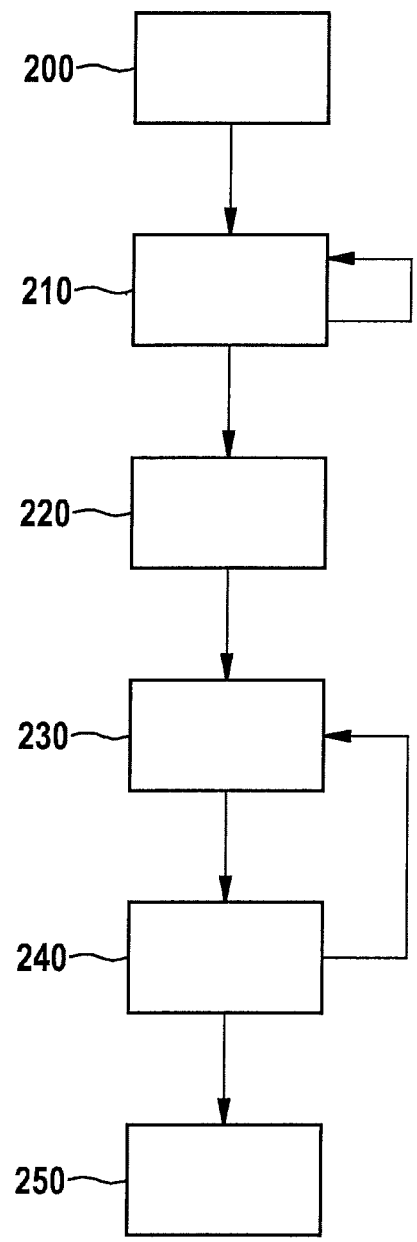
FIG. 2 shows a flow chart of another specific embodiment of the method according to the present invention.

One specific embodiment according to the present invention is shown in FIG. 2. In a first step 200 an electric actuation duration is predefined in which definitely no injection occurs. In a second step 210, it is checked whether an engine stop of the corresponding combustion engine exists. If this is not the case, query 210 occurs again after a certain period of time. If query 210 detects that an engine stop exists, i.e., that no injections occur, then in step 220 the actuation duration for a fuel injector to be learned or for the corresponding fuel injector to be learned is set to the predefined electric actuation duration determined in step 200.

Subsequently, in step 230 the actuation duration is increased by a predefined value. In a step 240 it is then checked whether an injection with a combustion has taken place. If this is not the case, then in step 230 in a subsequent engine stop, in particular in an immediately following engine stop, the actuation duration for the fuel injector to be learned is again increased by a predefined value. If query 240 detects that an injection with a combustion has taken place, then in step 250 the minimum injector-specific actuation duration for the corresponding fuel injector to be learned is set to the last adjusted actuation duration.

To detect the injection with a combustion it is possible in this case to compare an instantaneously measured engine speed signal of a crankshaft sensor with the engine speed signal of the same crankshaft sensor in which definitely no injection has taken place and no combustion has taken place. To compare the engine speed signals in this case, difference-forming methods and/or an evaluation of corresponding engine speed gradients of engine speed signals and/or comparisons of engine speed patterns are used. It is also conceivable that the measuring window selected for the engine speed signal to be instantaneously measured is an area of the crankshaft in which a change in speed of the fuel injector or of the injector valve is to be expected.

Figure 3:
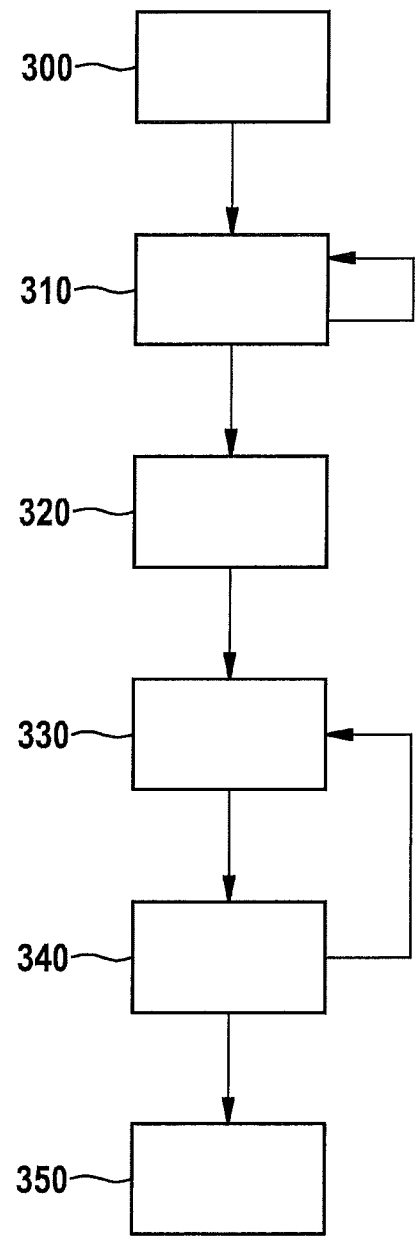
FIG. 3 shows another flow chart of another specific embodiment of the method according to the present invention.

FIG. 3 shows another specific embodiment of the method according to the present invention in which a minimum injector-specific electric actuation duration for at least one fuel injector of an internal combustion engine of a motor vehicle is learned and determined, the method being carried out in the case represented here in the engine start of the internal combustion engine. For this purpose, an electric actuation duration is determined in a step 300 in which definitely no injection with a combustion occurs, and in a step 310 it is initially checked whether an engine start exists. If this is not the case, the query 310 again occurs after a period of time. If query 310 detects that an engine start exists and no injection does yet occur, then in step 320 the actuation duration for the fuel injector to be learned is set to the predefined electric actuation duration in which definitely no injection occurs. Then in step 330, the actuation duration is increased by a fixed predefined value. Then in step 340 it is checked whether an injection with a combustion has taken place. If this is not the case, then in step 330 in a following, in particular immediately following, engine start, the actuation duration for this fuel injector is again increased by a fixed value. If query 340 then detects that an injection with a combustion occurs, then in a step 350 the minimum actuation duration for the corresponding fuel injector is set to the last adjusted value.

In the event the method is carried out in the engine start of the internal combustion engine, a second possible fuel injector at which injection and ignition may occur is determined based initially on a detection of the position of the stopped internal combustion engine, and is set as the fuel injector to be learned on which the above-described learning and determining of the actuation duration may be carried out.

The injector-specific minimum electric actuation duration is stored and secured in a control unit memory of the motor vehicle.

The learning process for a minimal actuation duration executable by the method according to the present invention is, depending on respective fuel injector types, individually repeated until a desired adaptation of the corresponding actuation duration is achieved. Furthermore, the learning process to be carried out with the method according to the present invention may, if needed, only be employed if this is required for implementing an on-board diagnostic strategy or is required for monitoring legislation.

Here, depending on the product, the minimum actuation duration for an adaptation of fuel injectors in new condition is used initially in short intervals, later in longer intervals. Specific intervals in such a case must be stored in diagrams or characteristic parameters such as, for example, actuation duration, switching cycles, mileage of internal combustion engine in h, or km, mileage of the motor vehicle in km.

The method according to the present invention and the learning process to be achieved therewith are naturally restarted with each replacement of individual fuel injectors.

An initial configuration of a minimum actuation duration of the fuel injectors used, i.e., with the motor vehicle or injection system in new condition, is selected in such a way that the fuel injectors reliably open at the minimum actuation duration (application data), taking into consideration variations and tolerances during production of each. It is only with the learning method provided according to the present invention that the minimum injector-specific actuation duration is generally shorter and thereby optimized.

What is claimed is:

1. A method for learning and determining a minimum injector-specific electric actuation duration for at least one fuel injector of an internal combustion engine of a motor vehicle, the method comprising:
    starting with a predefined electric actuation duration which definitely does not result in an injection, gradually increasing the electric actuation duration in one or more engine stops and/or one or more engine starts of the internal combustion engine up to an actuation duration in which an injection with a combustion occurs, wherein the internal combustion engine is not operated in a coasting phase while the gradual increasing is performed; and determining the actuation duration, in which an injection with a combustion occurs, as the minimum electric actuation duration.

2. The method of claim 1, wherein the injection with a combustion is detected by comparing an instantaneously measured engine speed signal of a crankshaft sensor with the engine speed signal of the same crankshaft sensor in which definitely no injection has taken place and no combustion has taken place.

3. The method of claim 2, wherein the engine speed signals are compared by difference-forming methods, an evaluation of corresponding engine speed gradients, and/or comparisons of engine speed patterns.

4. The method of claim 2, wherein the measuring window selected for the engine speed signal to be instantaneously measured is an area of the crankshaft in which a change in speed of the fuel injector is to be expected.

5. The method of claim 1, wherein, if the method is performed in the engine stop of the internal combustion engine, a normal switching off of injections for the internal combustion engine occurs following a switch-off signal with the fuel injector situated in a regular injection sequence of the fuel injectors before the fuel injector to be learned.

6. The method of claim 1, wherein, if the method is performed in engine start of the internal combustion engine, a second possible fuel injector at which injection and ignition may occur is determined based on a detection of the position of the stopped internal combustion engine, and the learning and determining of the actuation duration is then carried out on this fuel injector.

7. The method of claim 1, wherein the determined injector-specific electric actuation duration is stored and secured in a control unit memory of the motor vehicle.

8. The method of claim 1, wherein a combustion chamber pressure sensor is used alternatively or in addition to the engine speed signals to be measured for detecting the injection with a combustion.

9. The method of claim 1, in which an approximation of the minimum actuation duration to be determined is achieved in that, starting with the predefined electric actuation duration which definitely does not result in an injection, the actuation duration in each engine stop of successive engine stops is increased in each case successively by a predefined number of increments, and once an actuation duration is achieved which results in an injection with a combustion, the thus determined actuation duration is reduced in subsequent engine stops by a number of decrements which is respectively smaller in amount than the respective increments until an interruption of an injection with a combustion results, the last achieved actuation duration which does not quite yet result in an interruption of the injection then being defined as the minimum actuation duration.

10. A device for learning and determining a minimum injector specific electric actuation duration for at least one fuel injector of an internal combustion engine, comprising:
an arrangement, starting with a predefined electric actuation duration which definitely does not result in an injection, to gradually increase the electric actuation duration in one or more engine stops and/or one or more engine starts of the internal combustion engine up to an actuation duration in which an injection with a combustion occurs, wherein the internal combustion engine is not operated in a coasting phase while the gradual increasing is performed; and
a determining arrangement to determine the actuation duration, in which an injection with a combustion occurs, as the minimum electric actuation duration.

11. A method for learning and determining a minimum injector-specific electric actuation duration for at least one fuel injector of an internal combustion engine of a motor vehicle, the method comprising:
gradually lowering, starting with a predefined electric actuation duration which results in an injection with a combustion, the electric actuation duration in each engine stop of successive engine stops to an actuation duration in which just an interruption of an injection with a combustion occurs, the last achieved actuation duration, which does not quite yet result in an interruption of the injection, wherein the internal combustion engine is not operated in a coasting phase while the gradual lowering is performed; and
determining the last achieved actuation duration, which does not quite yet result in an interruption of the injection, as the minimum electric actuation duration.

* * * * *